(12) United States Patent
Nichols, Sr.

(10) Patent No.: US 9,668,468 B1
(45) Date of Patent: Jun. 6, 2017

(54) NESTING DETERRENT

(71) Applicant: Michael L. Nichols, Sr., Philadelphia, TN (US)

(72) Inventor: Michael L. Nichols, Sr., Philadelphia, TN (US)

(*) Notice: Subject to any disclaimer, the term of this patent is extended or adjusted under 35 U.S.C. 154(b) by 0 days.

(21) Appl. No.: 14/499,938

(22) Filed: Sep. 29, 2014

Related U.S. Application Data

(60) Provisional application No. 61/885,038, filed on Oct. 1, 2013.

(51) Int. Cl.
*E04B 1/72* (2006.01)
*A01M 29/32* (2011.01)
*A01M 99/00* (2006.01)

(52) U.S. Cl.
CPC ............ *A01M 29/32* (2013.01); *A01M 99/00* (2013.01); *E04B 1/72* (2013.01)

(58) Field of Classification Search
CPC ..... E04D 13/004; A01M 29/26; A01M 29/32; A01M 99/00; E04B 1/72
USPC ............................................ 52/101, DIG. 4
See application file for complete search history.

(56) References Cited

U.S. PATENT DOCUMENTS

| | | | | |
|---|---|---|---|---|
| 3,008,140 A | * | 11/1961 | Rose | H01Q 3/005 343/758 |
| 3,148,417 A | * | 9/1964 | Bellas | 52/101 |
| 4,234,753 A | * | 11/1980 | Clutter | 174/5 R |
| 5,299,528 A | * | 4/1994 | Blankenship | 119/537 |
| 5,649,394 A | * | 7/1997 | Ohba | 52/101 |
| 5,666,767 A | * | 9/1997 | Ohba | 52/101 |
| 5,850,808 A | * | 12/1998 | Burdick | 119/713 |
| 5,873,324 A | | 2/1999 | Kaddas et al. | |
| 5,884,426 A | * | 3/1999 | Ishida | 43/1 |
| 6,318,686 B1 | | 11/2001 | No | |
| 6,402,107 B1 | | 6/2002 | Chervick et al. | |
| 7,196,265 B2 | | 3/2007 | Spencer | |
| 2010/0251633 A1 | * | 10/2010 | Sabine et al. | 52/101 |

OTHER PUBLICATIONS http://www.aplic.org/uploads/files/2613/SuggestedPractices-2006(LR-2watermark).pdf "Chapter 5, Suggested Practices, Power line design and avian safety", pp. 59-166 of the publication.
http://www.kplu.org/post/seattle-city-light-tries-osprey-deterrent-utility poles (Apr. 25, 2011).

* cited by examiner

*Primary Examiner* — Basil Katcheves
(74) *Attorney, Agent, or Firm* — Robert C. Montgomery; Montgomery Patent & Design

(57) ABSTRACT

An apparatus is adapted to be installed on a top portion of a utility pole to allow perching upon by birds while preventing the nesting of birds thereby avoiding damage to the utility equipment, or the accidental death of the birds.

15 Claims, 2 Drawing Sheets

NESTING DETERRENT

RELATED APPLICATIONS

The present invention was first described in and claims the benefit of U.S. Provisional Application No. 61/885,038, filed Oct. 1, 2013, the entire disclosures of which are incorporated herein by reference.

FIELD OF THE INVENTION

The present invention relates to a post having semi-rigid extensions, which is attached to a top portion of a utility pole to promote perching on the extensions as opposed to perching on the utility pole, and also prevents nesting on the extensions as well as the utility pole.

BACKGROUND OF THE INVENTION

Many people enjoy the presence of birds on their property as evidence by the abundance of bird feeders and birdbaths that can be seen in yards throughout the country. But even bird lovers must admit that when birds roost near and on utility poles, disaster is often the end result. Due to the close proximity to energized electrical components, nests often make contact with the components leading to short circuits. This causes blackouts to possibly wide areas of homes and businesses, resulting in financial loss, and perhaps physical damage. Even if power failures do not occur, large birds such as eagles and ospreys can be severely injured, or even killed should they themselves come in contact with live electrical components. Accordingly, there exists a need for a means by which large birds can be prevented from roosting and a nesting on or near utility poles. The development of the present invention fulfills this need.

SUMMARY OF THE INVENTION

The inventor has seen a need for such a device to provide a way to protect utility poles from nesting birds, and subsequently protecting said birds from damage or death as well as consumers of energy transmitted along lines supported by said poles from experiencing disruptions in service.

In order to accomplish this need, it is an object of the present invention to provide such a nesting deterrent device including an elongate central shaft, at least one (1) cross pole, at least one (1) coupling capable of slidably receiving said top end of said shaft, and a mount adapted to secure a bottom end of the shaft to a utility pole. Each coupling is capable of receiving an individual cross pole.

It is a further object of the present invention to provide such a device having an upper coupling having a first pair of receiving sleeves adapted to be slid over and affixed to the shaft approximately two feet below the top end, a pair of semi-rigid upper cross poles each attached to one (1) of a second pair of receiving sleeves of the upper coupling, a lower coupling having a first pair receiving sleeves adapted to be slid over and affixed to the shaft approximately one (1) foot above the utility pole, and a pair of semi-rigid lower cross poles each attached to one (1) of a second pair of receiving sleeves of the lower coupling.

It is a further object of the present invention to provide such lower cross poles having a general arcuate shape and oriented perpendicular from the pair of upper cross poles.

It is a further object of the present invention to provide where the elongated shaft, each of the pair of upper cross poles, and each of the pair of lower cross poles exhibits low electric conductivity.

It is yet another object of the present invention to provide a mount for mounting the bottom of the elongated shaft to the utility pole, where the elongated shaft is capable of being vertically positionable to a desired position.

It is still yet another object of the present invention to provide a cap removably attached to a top end of the elongated shaft.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
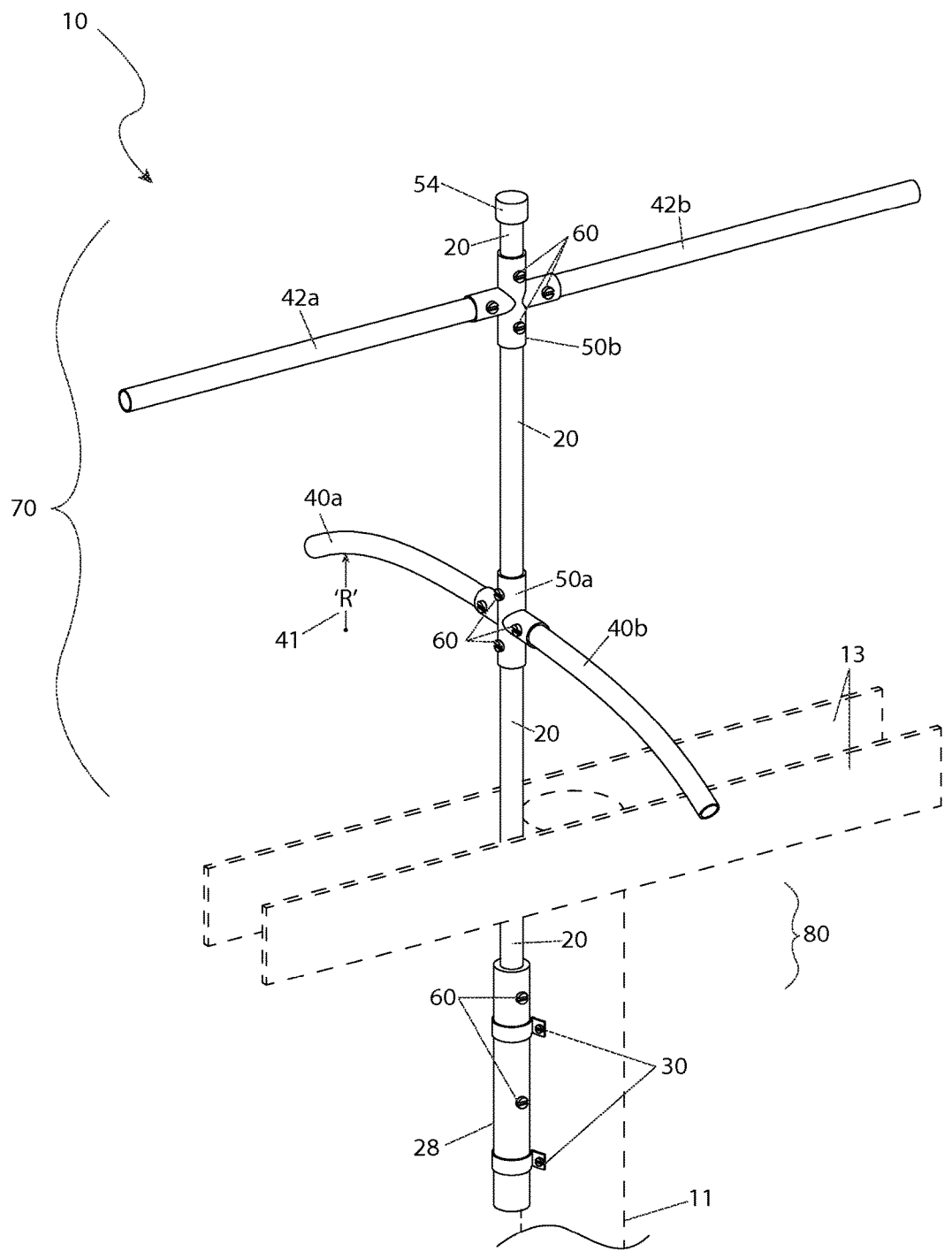
FIG. 1 is an environmental view of a bird nesting deterrent 10, in accordance with the preferred embodiment of the present invention; and, FIG. 2 is a perspective view of a cross fitting portion 50a, 50b, in accordance with the preferred embodiment of the present invention.

DESCRIPTIVE KEY 10 bird nesting deterrent
11 utility pole
13 cross-member
20 stand post
28 holder
30 first fastener
40a first lower cross pole
40b second lower cross pole
41 radius
42a first upper cross pole
42b second upper cross pole
50a lower cross fitting
50b upper cross fitting
52a upper opening
52b lower opening
52c first opening
52d second opening
54 cap
56 inner diameter
58 outer diameter
60 second fastener
70 top section
80 bottom section

DETAILED DESCRIPTION OF THE PREFERRED EMBODIMENT

Figure 2:
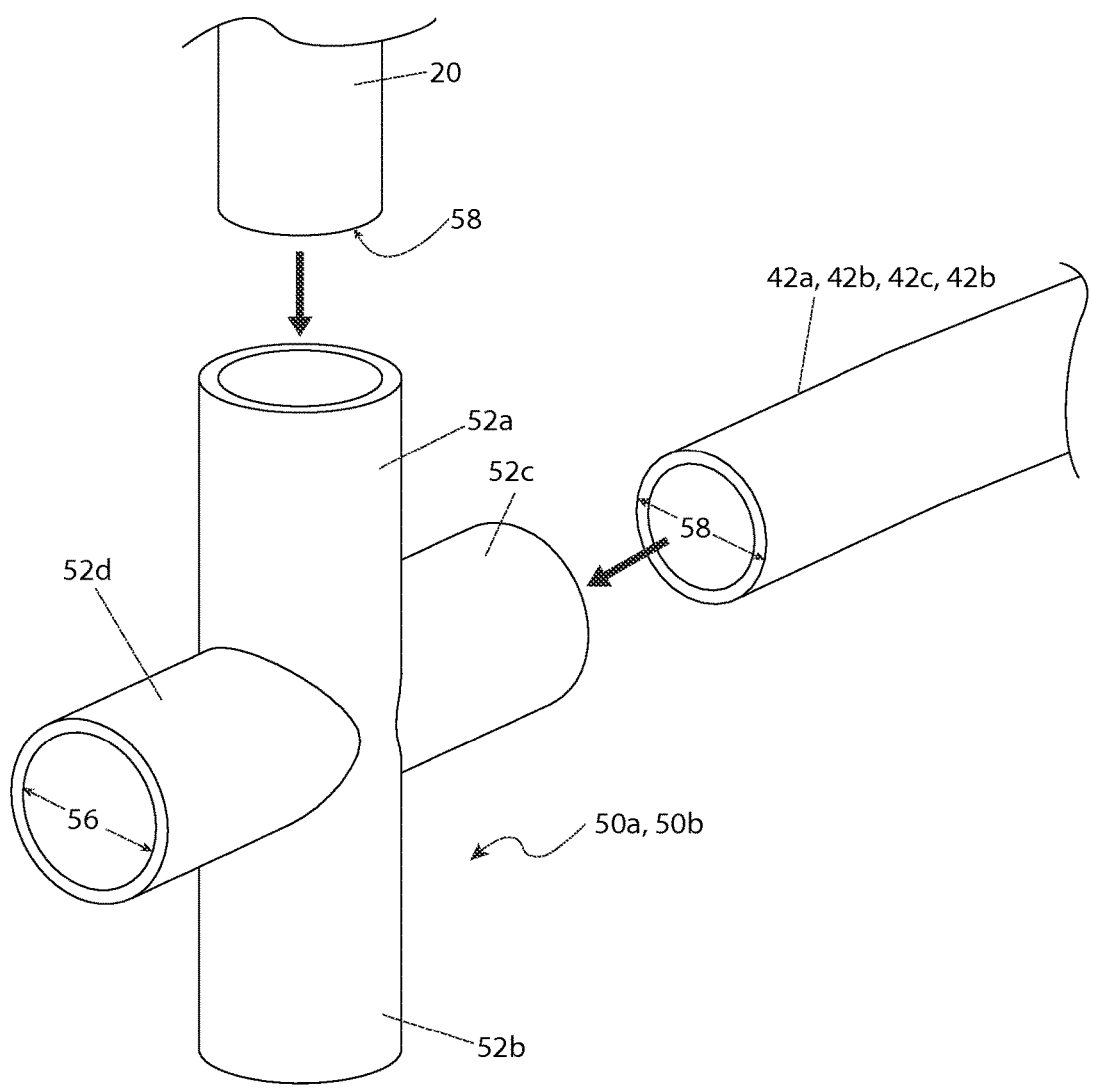

The best mode for carrying out the invention is presented in terms of its preferred embodiment, herein depicted within FIGS. 1 and 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a bird nesting deterrent (herein referred to as the "device") 10, which secures to an upper portion of an existing utility pole 11 and employs cross poles 40a, 40b, 42a, 42b to enable perching of birds, while preventing nesting of birds.

Referring now to FIG. 1, an environmental view of the device 10, in accordance with the preferred embodiment of the present invention, is disclosed. The device 10 provides a vertical stand post 20 being approximately one inch (1 in.) in diameter, including a bottom section 80 being attached to a top portion of an existing utility pole 11 in a parallel manner. The stand post 20 is inserted into a tubular holder 28 capable of being mounted to a side surface of the utility pole 11. The holder 28 provides a length of plastic conduit approximately one and one-quarter inches (1½ in.) in diameter and being affixed to the utility pole 11 using a plurality of first fasteners 30, preferably being conduit clamps, or an equivalent clamping means, based upon the utility pole size, weather conditions, and the like. The stand post 20 is inserted into the holder 28, positioned vertically as desired, and secured using a plurality of second fasteners 60 such as screws or bolts.

The stand post 20 is approximately sixty inches to ninety-six inches (60-96 in.) in length. A top section 70 of the stand post 20 extends vertically beyond top-mounted cross-member portions 13 of the utility pole 11 approximately two feet (2 ft.). The top section 70 of the stand post 20 supports a lower "T"-shaped assembly including a lower cross fitting 50a a first lower cross pole 40a, and a second lower cross pole 40b. The top section 70 of the stand post 20 also supports an upper "T"-shaped assembly including an upper cross fitting 50b, a first upper cross pole 42a, and a second upper cross pole 42b. The cross poles 40a, 40b, 42a, 42b extend perpendicularly from the stand post 20 and are to be rigid enough to support a perched bird, but flexible enough to bend under a load of a bird nest, thereby preventing establishment of a nest upon the utility pole 11. The configuration and orientation of the device 10, when attached to a utility pole 11, enables a bird to perch upon the device 10, but positions the bird so as to decrease a risk of making contact with any of the electrified components of the utility pole 11.

The stand post 20 insertingly passes through hollow upper opening 52a and lower opening 52b portions of the lower cross fitting 50a being positioned and secured upon the stand post 20 approximately one foot (1 ft.) above the cross-member portions 13 of the utility pole 11 using at least one (1) second fastener 60. In a similar manner, the stand post 20 also insertingly passes through the upper opening 52a and lower opening 52b portions of the upper cross fitting 50b, being positioned and secured to the stand post 20 approximately four inches (4 in.) above the lower cross fitting 50a using at least one (1) additional second fastener 60.

The first side opening 52c and second side opening 52d portions of the lower cross fitting 50a provide inserted connection of respective first lower cross pole 40a and second lower cross pole 40b portions, which are secured thereto using at least one (1) second fastener 60. In a similar manner, the first side opening 52c and second side opening 52d portions of the upper cross fitting 50b provide inserted connection of respective first upper cross pole 42a and second upper cross pole 42b portions, which are also secured using at least one (1) second fastener 60. Each lower cross pole 40a, 40b is approximately four feet (4 ft.) in length and extends from the respective opening 52c, 52d in a horizontal direction and subsequently having a downward arcuate shape having a radius of approximately three feet (3 ft.) as indicated by dimension 'R' 41 in FIG. 1. Each lower cross pole 40a, 40b is to be positioned perpendicular to the cross-members 13. The arrangement of the lower cross poles 40a, 40b and upper cross poles 42a, 42b is specifically designed to enable the perching of birds, while preventing attempts by the birds to establish a nest.

A standard plastic pipe cap 54 is to be mounted to enclose an upper end portion of the stand post 20. The assembled portions of the device 10 are secured to each other using second fasteners 60, thereby providing a means of easily assembling and disassembling the portions of the device 10 as needed.

The stand post 20, cross poles 40a, 40b, 42a, 42b, and cross fittings 50a, 50b are envisioned being made using a hollow tubular material exhibiting low electric conductivity, preferably using a durable plastic material such as polyvinylchloride (PVC), polypropylene, acrylonitrile butadiene styrene (ABS), or the like. However, other configurations and equivalent materials may be utilized without deviating from the teachings of the device 10.

Referring now to FIG. 2, a perspective view of a cross fitting portion 50a, 50b, in accordance with the preferred embodiment of the present invention, is disclosed. The upper opening 52a, lower opening 52b, first side opening 52c, and second side opening 52d portions of each cross fitting 50a, 50b provide an inner diameter 56 being sized to slidingly receive outer diameter portions 58 of the stand pipe 20 and cross poles 40a, 40b, 42a, 42b portions for subsequent securement using second fasteners 60.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing the device 10 may be achieved by performing the following steps: acquiring the device 10; attaching a holder 28 to an upper side surface of the utility pole 11 using a plurality of first fasteners 30 such as conduit clamps; sliding a lower cross fitting 50a over the top end of the stand post 20; positioning the lower cross fitting 50a approximately ten inches (10 in.) from a top end of the stand post 20; securing the lower cross fitting 50a to the stand post 20 by installing at least one (1) second fastener 60 such as a screw or bolt; slidably inserting a first lower cross pole 40a and a second lower cross pole 40b into respective first side 52c and second side 52d openings of the lower cross fitting 50a; securing the lower cross poles 40a, 40b to the lower cross fitting 50a via additional second fasteners 60; slidably inserting an upper cross fitting 50b upon the stand post 20; positioning the upper cross fitting 50b approximately three inches (3 in.) from a top end of the stand post 20; securing the upper cross fitting 50b to the stand post 20 by installing at least one (1) second fastener 60; inserting and securing the corresponding first upper cross pole 42a and second upper cross pole 42b portions into respective first side 52c and second side 52d openings of the upper cross fitting 50b using additional second fasteners 60; installing a cap 54 onto a top end of the stand post 20 and securing with second fasteners 60; sliding a bottom end portion of the stand post 20 into the holder 28 such that the lower cross poles 40*a*, 40*b* are positioned approximately one foot (1 ft.) above and perpendicular to the cross-member portions 13 of the utility pole 11; securing the stand post 20 to the holder 28 using additional second fasteners 60; and, allowing the device 10 to promote perching of birds while deterring nesting, by using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A nesting deterrent device comprising:
   a rigid elongated tubular holder;
   a lower coupling having a top opening and a bottom opening and two side openings;
   an upper coupling having a top opening and a bottom opening and two side openings;
   a stand post having a bottom end in said tubular holder, a top end and a body passing through said top opening and said bottom opening of said lower coupling, said body further passing through said top opening and said bottom opening of said upper coupling;
   a first upper cross pole extending from a side opening of said upper coupling;
   a second upper cross pole extending from the other side opening of said upper coupling;
   a first lower cross pole extending from a side opening of said lower coupling;
   a second lower cross pole extending from the other side opening of said lower coupling; and,
   a first fastener to secure said tubular holder to a pole;
   wherein said first lower cross pole has an arcuate shape.

2. The device recited in claim 1, wherein said first upper cross pole is semi-rigid.

3. The device recited in claim 1, wherein said arcuate shape comprises a radius of approximately three feet.

4. The device recited in claim 1, wherein said stand post exhibits low electric conductivity.

5. The device recited in 1, wherein each cross pole is approximately four feet in length.

6. The device recited in claim 1, wherein said stand post is rigid.

7. The device recited in claim 1, wherein said stand post is approximately sixty inches to ninety-six inches in length.

8. The device recited in claim 1, wherein said lower coupling is adaptably placed on said stand post.

9. The device recited in claim 1, wherein said upper coupling is adaptably placed on said stand post approximately two feet below said top end.

10. The device recited in claim 1, further comprising a cap removably attached to said top end of said stand post.

11. The device recited in claim 10, wherein each cross pole and said stand post exhibits low electric conductivity.

12. The device recited in claim 1, wherein said first fastener is a clamp.

13. The device recited in claim 12, wherein said first fastener is a conduit clamp.

14. The device recited in claim 1, further including a second fastener retaining said stand post in said tubular holder.

15. The device recited in claim 1, further including a second fastener retaining said first upper cross pole to said upper coupling.

* * * * *